United States Patent
Oran

(10) Patent No.: US 7,570,579 B2
(45) Date of Patent: *Aug. 4, 2009

(54) METHOD AND APPARATUS FOR FAST FAILURE DETECTION IN SWITCHED LAN NETWORKS

(75) Inventor: David R. Oran, Acton, MA (US)

(73) Assignee: Cisco Technology, Inc., San Jose, CA (US)

(*) Notice: Subject to any disclaimer, the term of this patent is extended or adjusted under 35 U.S.C. 154(b) by 424 days.

This patent is subject to a terminal disclaimer.

(21) Appl. No.: 11/270,428

(22) Filed: Nov. 8, 2005

(65) Prior Publication Data

US 2006/0062141 A1 Mar. 23, 2006

Related U.S. Application Data

(63) Continuation of application No. 09/882,213, filed on Jun. 14, 2001, now Pat. No. 7,085,224.

(51) Int. Cl.
*H04L 1/00* (2006.01)
*G06F 11/00* (2006.01)

(52) U.S. Cl. .................. 370/216; 370/242; 370/250; 714/25; 714/48

(58) Field of Classification Search ......... 370/216–228, 370/237, 242–245, 254; 714/1–4, 25, 48; 709/221, 224, 235, 239, 242

See application file for complete search history.

(56) References Cited

U.S. PATENT DOCUMENTS

| | | | |
|---|---|---|---|
| 5,914,798 A | 6/1999 | Liu | |
| 5,959,968 A | 9/1999 | Chin et al. | |
| 6,032,194 A | 2/2000 | Gai et al. | |
| 6,104,696 A | 8/2000 | Kadambi et al. | |
| 6,256,314 B1 | 7/2001 | Rodrig et al. | |
| 6,331,983 B1 | 12/2001 | Haggerty et al. | |
| 6,535,489 B1 | 3/2003 | Merchant et al. | |
| 6,581,166 B1 | 6/2003 | Hirst et al. | |
| 6,601,101 B1 | 7/2003 | Lee et al. | |
| 6,711,171 B1* | 3/2004 | Dobbins et al. | 370/400 |
| 6,757,281 B1 | 6/2004 | Irish | |
| 7,027,406 B1* | 4/2006 | Shabtay et al. | 370/252 |
| 7,152,179 B1* | 12/2006 | Critchfield | 714/4 |

OTHER PUBLICATIONS

*Configuring Cisco Discovery Protocol On Routers, RSMs, and Switches*, Copyright 1992-2001, pp. 1-9.
*Release Notes For The EtherSwitch 1420 and EtherSwitch 1220 Series Firmware*, Ver. 5.33, Jan. 17, 1997, pp. 1-6.

* cited by examiner

*Primary Examiner*—Tri H Phan
(74) *Attorney, Agent, or Firm*—Stolowitz Ford Cowger LLP

(57) ABSTRACT

A switch detects port failures and identifies a MAC address associated with the port failure. The switch then sends a failure notification message to other ports on the switch that identifies the MAC address associated with the port failure. The network processing devices on the other ports use the failure notification message to quickly determine if routes need to be reconfigured around an adjacency on the switch.

24 Claims, 7 Drawing Sheets

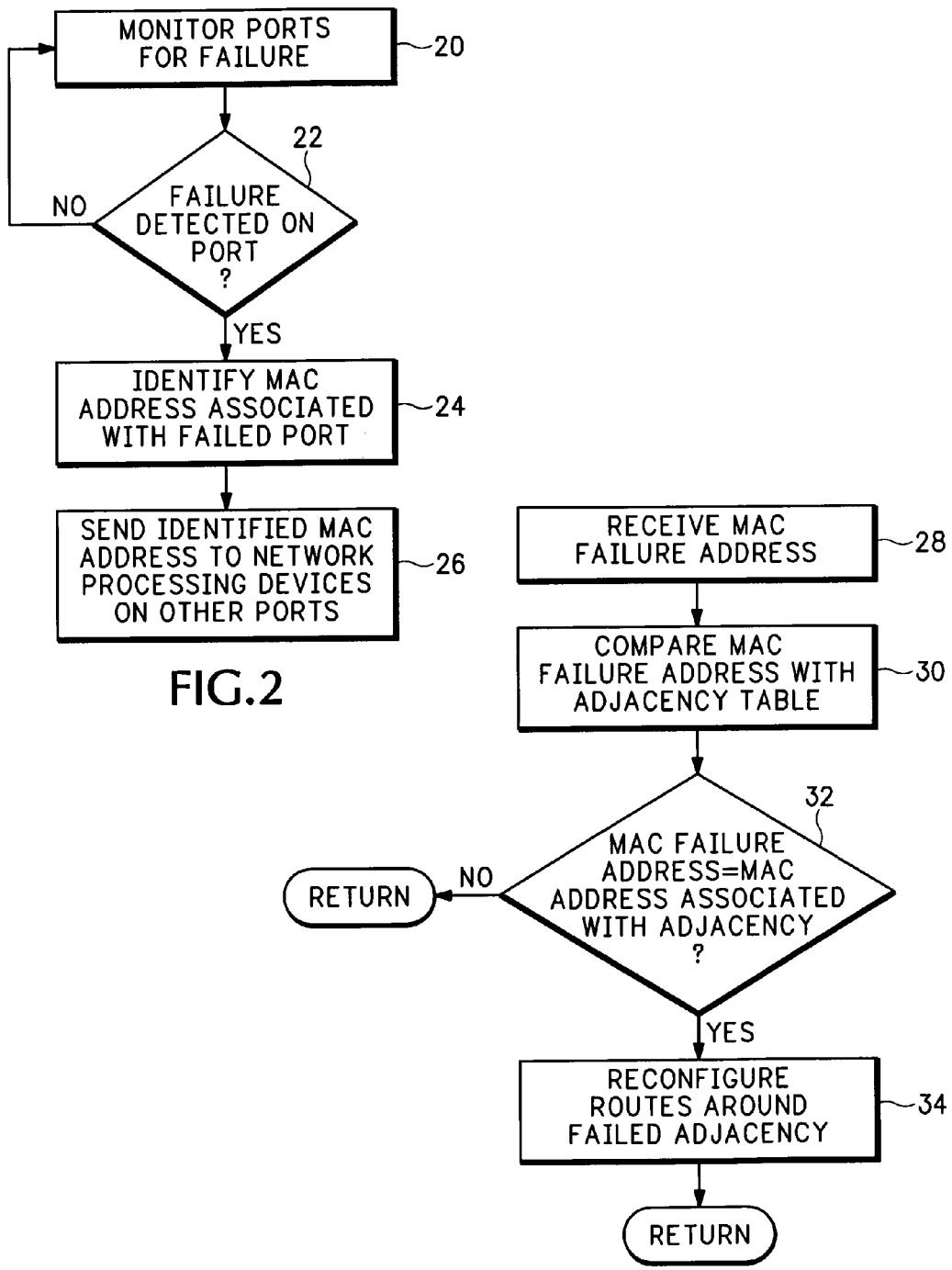

METHOD AND APPARATUS FOR FAST FAILURE DETECTION IN SWITCHED LAN NETWORKS

CROSS REFERENCE TO RELATED APPLICATIONS

This application is a continuation of U.S. patent application Ser. No. 09/882,213, filed on Jun. 14, 2001, now U.S. Pat. No. 7,085,224, which is herein incorporated by reference in its entirety.

BACKGROUND

Routers maintain topological information about a network in order to determine the correct paths for routing packets. The routers derive this topological information by continuously communicating with other routers or other network processing devices in the network (peers). An adaptive routing algorithm is used by the routers to identify communication failures and adaptively compute new routes around the failure. An adjacency is formed whenever a router communicates with a peer and is defined as a relationship with a neighboring network processing device. The router continuously determines which adjacencies are up and which are down. The longer is takes for the router to detect that an adjacency has gone down and route around it, the greater the chance a significant number of packets will get sent over the wrong routes, or sent to a down router and hence be lost.

There are two primary reasons why packets may not be successfully sent to an adjacency. The interface or link to the adjacency may have failed or the adjacency itself may have failed. Some links, such as digital TDM (Time Division Multiplexed) channels, SONET, and direct point-to-point Ethernet connections provide fast failure detection using hardware indications such as loss-of-light, missed heartbeat, etc. Failures can also be detected using a low-level link protocol mechanism such as OAM (Operation, Administration, and Maintenance) headers in Sonet (Synchronous Optical Network). In these detection schemes, there are direct links between the two network processing devices. This allows layer 1 physical interfaces to quickly identify failures which are then identified to the layer 3 routing algorithms which route around the identified failure.

In some common network configurations, routers are not connected directly together but are connected through a layer 2 switch. For example, a switched LAN (Local Area Network) may use a Gigabit Ethernet switch that includes different ports connected to PCs and to layer 3 routers. The routers connected to different switch ports can not immediately identify failures either of other routers or of the ports and links by which they are connected to the switch. The routers currently have to rely on slow timeout mechanisms, such as missed hello packets, to detect failures on other links connected to the switch.

For example, an IGP (Interior Gateway Protocol) uses "hello" message exchanges to discover and maintain link connectivity. If one of the routers fails to receive a "hello" acknowledge message after some period of time, the router failing to acknowledge the "hello" message is assumed to have gone down. The router sending the hello message then routes around the failed link.

A substantial amount of time is required to send and wait for replies to "hello" messages. For example, in one implementation hello messages are sent once every second. A failure is assumed only after three hello message go unacknowledged. Thus, upwards of three seconds are required to detect an adjacent link or adjacent router failure. The time required to detect failures can and often does dominate the time required for a routing algorithm to determine a new network topology around a detected failure (convergence time).

The hello message failure detection process takes much longer than layer 1 protocols used for detecting failures, but because the routers in switched networks are not connected directly together, the layer 1 failure protocols cannot be used.

The present invention addresses this and other problems associated with the prior art.

SUMMARY OF THE INVENTION

A switch detects port failures and identifies a MAC address associated with the port failure. The switch then sends a failure notification message to other ports on the switch that identifies the MAC address associated with the port failure. The network processing devices on the other ports use the failure notification message to quickly determine if routes need to be reconfigured around an adjacency on the switch.

BRIEF DESCRIPTION OF THE DRAWINGS

FIG. 2 is a flow diagram showing how a switch in the network shown in FIG. 1 identifies failures.

FIG. 3 is a flow diagram showing how a router in the network shown in FIG. 1 reconfigures routes around an identified failure.

DETAILED DESCRIPTION

Figure 1:
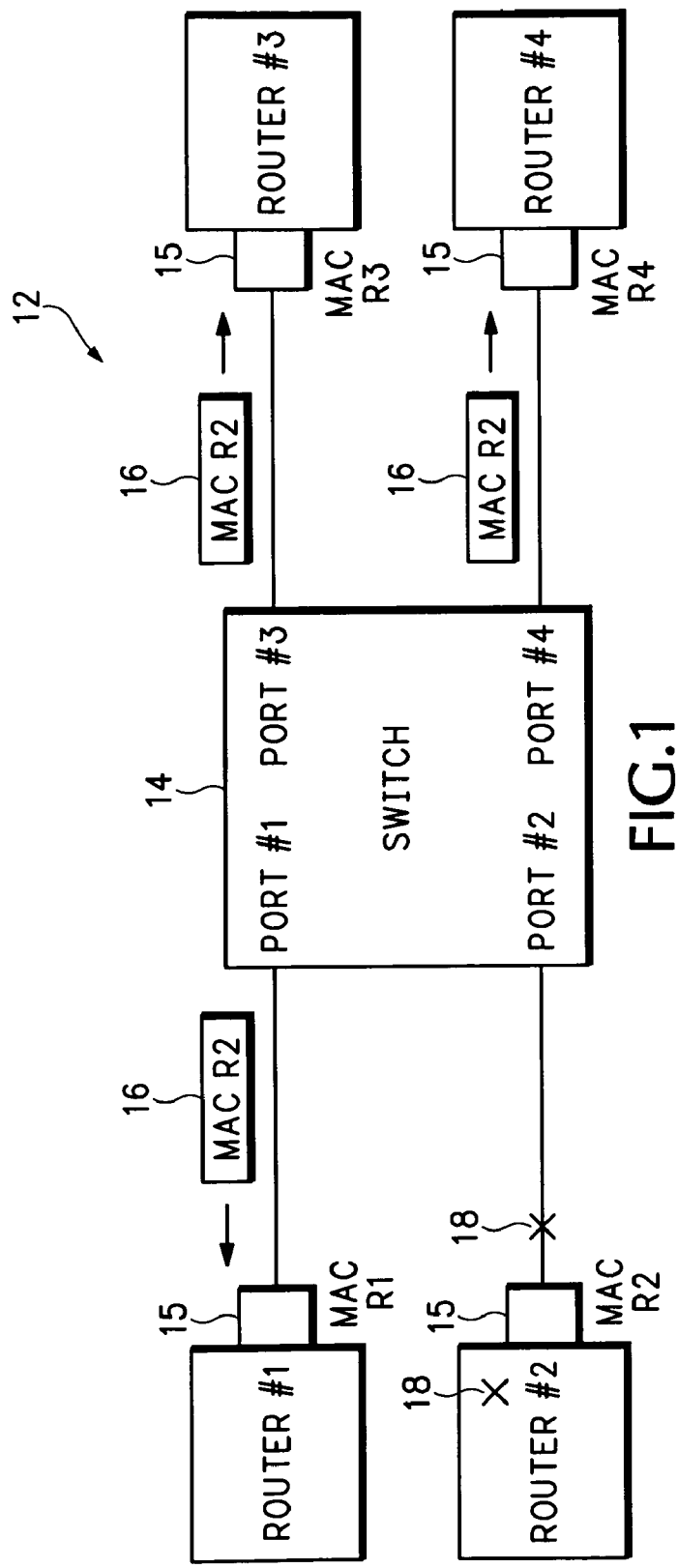
FIG. 1 is a block diagram of a network that provides Fast Failure Detection (FFD).

FIG. 1 shows a Fast Failure Detection (FFD) scheme that significantly improves the convergence time and responsiveness of IP routing algorithms. A network 12 includes a switch 14 coupled to multiple routers #1-#4. The switch 14 in one embodiment is an Ethernet layer 2 switch and the routers #1-#4 are layer 3 routers. However, the invention is applicable to any network architecture where network processing devices operating at layer 3 of the OSI (Open Systems Interconnection) reference model are coupled together through another network processing device operating at layer 2 of the OSI model. Each router #1-#4 is coupled to an associated port #1-#4, respectively, on the switch 14.

Each port on switch 14 learns the MAC addresses of all network elements attached to that switch port, using conventional techniques such as the IEEE 802.1D transparent bridging method. Usually there is only one MAC address accessible through a switch port, but if downstream layer-1 repeaters are used, or the switch is connected to other switches in a spanning tree, there could be than one.

In the example shown in FIG. 1, the ports #1-#4 in switch 14 have currently associated with them routers #1-#4. These routers in turn each have a network adapter 15 with a corresponding MAC address MAC R1-MAC R4. The routers #1-#4 communicate through the switch 14 by including their own MAC address as the source address, and the MAC address of the adjacent router in the destination address, of transmitted layer 2 frames.

Referring to FIGS. 1 and 2, the switch 14 in block 20 monitors ports #1-#4 for any failures. The switch 14 uses existing hardware or software mechanisms to determine when a device attached to a port, or the port itself, is no longer operational. For example, loss-of-light detection can be used for optical links and heartbeats signals can be used for copper connections.

If a failure is detected in block 22, the switch identifies the MAC address(es) associated with the failed port or failed router in block 24. It is not sufficient to simply indicate a port has gone down. The active routers need to know the exact MAC address that is unreachable, so the right adjacency can be identified and routed around.

In the example shown in FIG. 1, a failure 18 occurs either in router #2 or on port #2. The switch 14 in block 26 (FIG. 2) informs the still-active switch ports #1, #3 and #4 of the failure by sending a failure notification message 16 (FIG. 1). The failure notification message 16 includes the MAC address MAC R2 of the router associated with port #2 on switch 14.

FIGS. 1 and 3 show the operations taken by the active routers after receiving the failure notification message 16. The active router or routers in block 28 each receive the failure notification message 16 from the switch 14 over their active switch ports. Each active router in block 30 searches through the adjacency table for the LAN interface over which the failure message arrived to determine if any adjacencies on that interface match the MAC address reported in the failure notification message 16.

If any adjacencies are identified that are currently "up" in block 32, they are immediately declared down and a route recomputation is initiated in block 34. For example, the routers on ports #1, #3 and #4 each receive the MAC address MAC R2 in block 28 associated with failed port #2. Each router #1, #3 and #4 compares the received MAC address MAC R2 with adjacencies in their individual per-interface adjacency tables. If the MAC address MAC R2 matches one of the adjacencies, that router routes around the MAC R2 address. If the MAC address MAC R2 does not match any adjacencies in block 32, the router does not reconfigure routes.

The FFD scheme described above is particularly useful in switched LANs (Local Area Networks) where router arrays in service provider POPs (Point Of Presence) and in large enterprise offices are often constructed out of routers attached to switches as opposed to connected directly in a mesh, or via a shared Ethernet channel.

Network Processing Devices Coupled to Multiple Switch Ports

Figure 4:
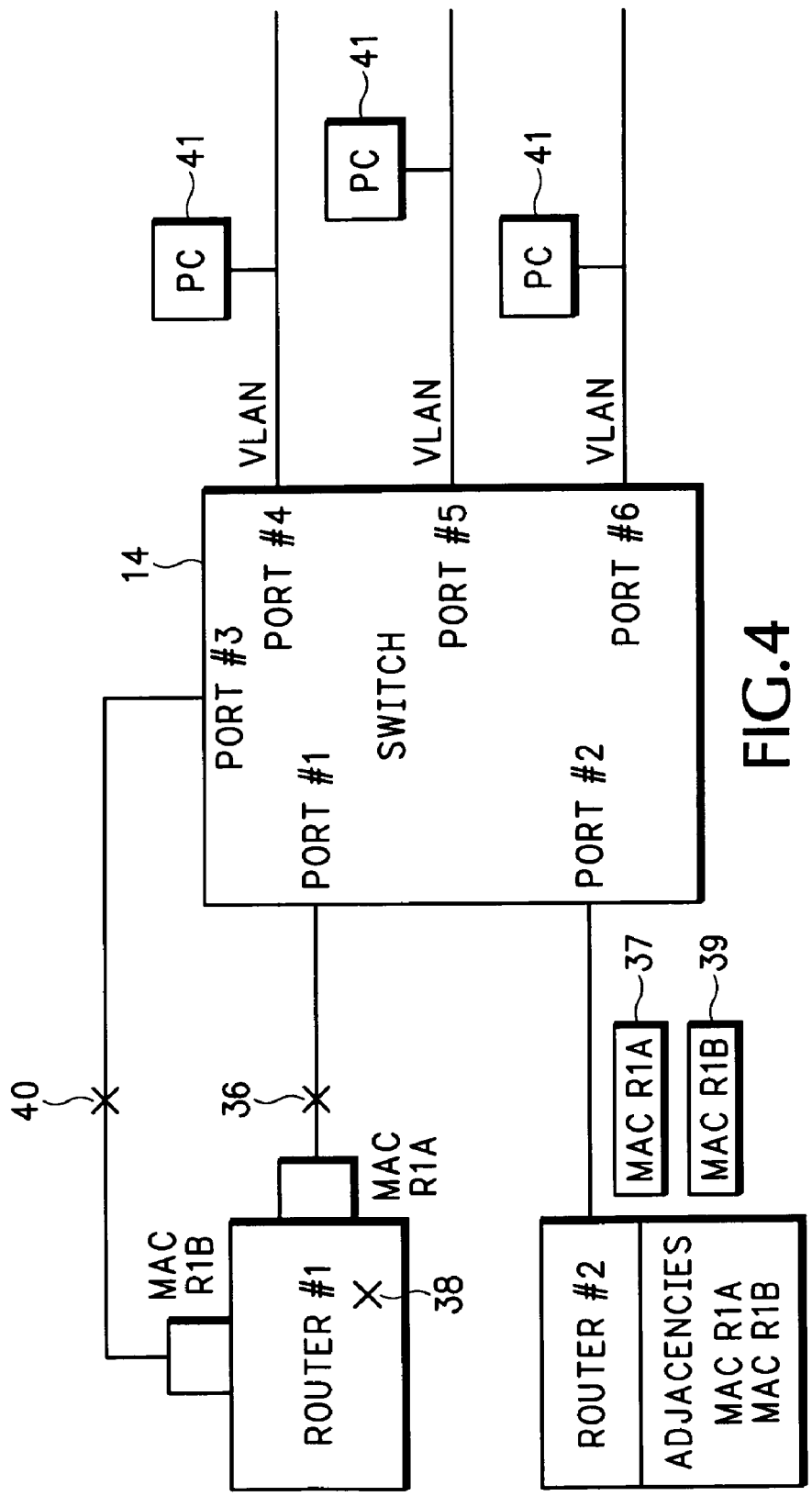
FIG. 4 is a block diagram of a network where FFD is performed in a switch that has multiple ports connected to the same router.

Referring to FIG. 4, a router may be attached to the switch 14 through multiple ports. For example, a router #1 is connected to the switch 14 though both port #1 and port #3. Port #1 has an associated MAC address MAC R1A and port #3 has an associated MAC address MAC R1B.

When a failure 36 occurs on port #1, router #2 does not necessarily have to reroute around router #1. Router #2 can still route packets to router #1 through port #3. Similarly, when a failure 40 occurs on port #3, router #2 may still be able to route packets to router #1 over port #1. However, when failures 36 and 40 occur on ports #1 and #3 at the same time, or a failure 38 occurs on router #1, then router #2 has to reroute packets around router #1.

Accordingly, router #2 only needs to reroute around router #1 when failure notifications 37 and 39 are received for MAC addresses MAC R1A and MAC R1B associated with both port #1 and port #3.

Figure 5:
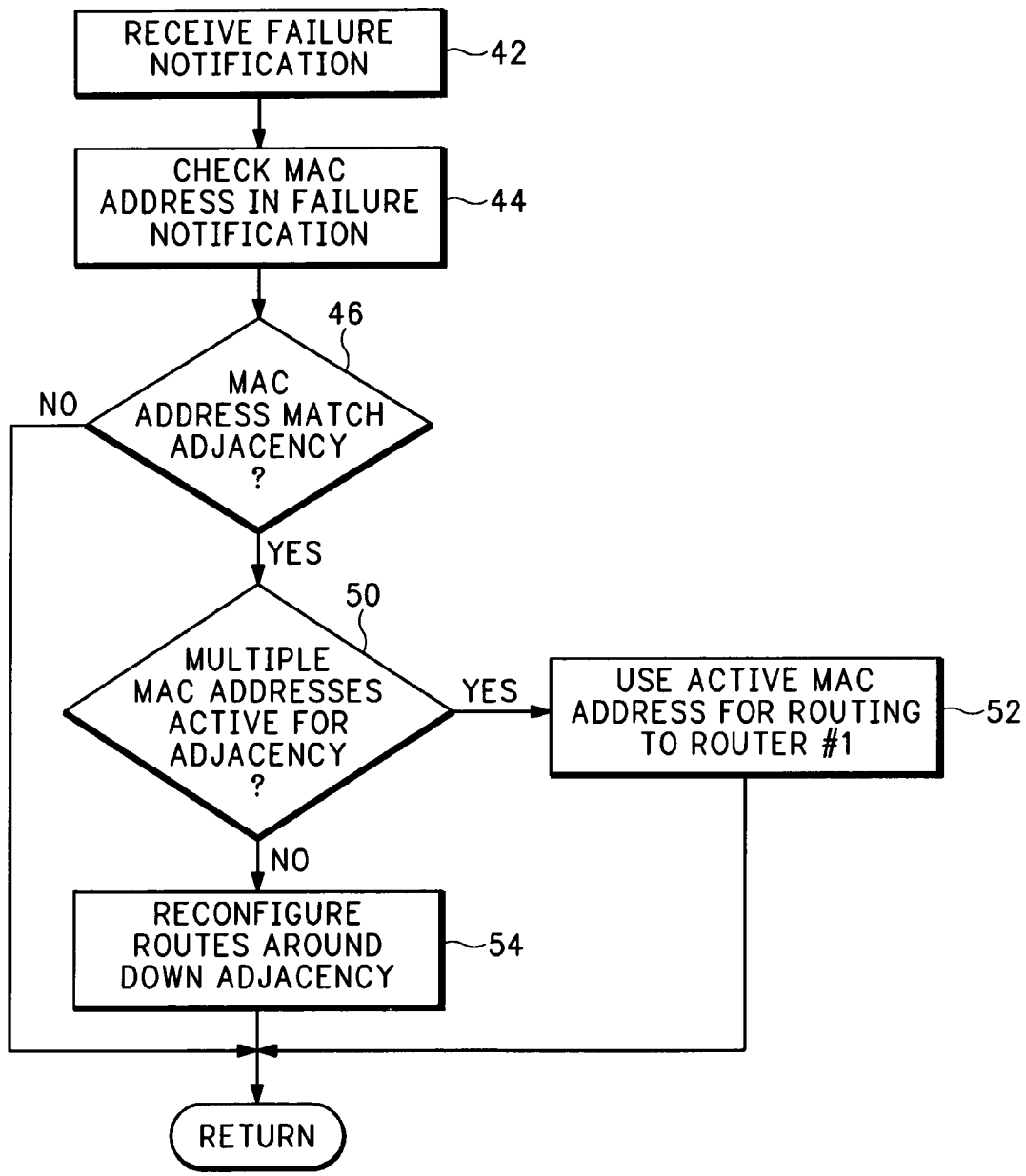
FIG. 5 is a flow diagram showing how a router in the network shown in FIG. 4 routes around a failure.

FIG. 5 describes how router #2 processes failure notifications from switch 14 for multiple MAC adjacencies for the same router. In block 42 the router #2 receives a failure notification message. The router #2 in block 44 checks the MAC address in the failure notification with MAC adjacencies. If the MAC address in the failure notification does not match any adjacencies for that LAN interface, then the router #2 in block 46 does not reconfigure routes around router #1. If the MAC address matches an adjacency, then the router #2 in block 50 determines if there are multiple active MAC addresses associated with the same adjacency. If there is only one active MAC address associated with the same adjacency, the router #2 reconfigures routes around the down adjacency in block 54.

If there are multiple active MAC addresses for the same adjacency, then the router #2 in block 52 uses one of the other identified active MAC addresses to route packets to router #1. If all of the MAC addresses for the adjacency are down, then the router #2 reconfigures the routes around router #1 in block 54.

Referring back to FIG. 4, some of the devices connected to the ports of switch 14 may not be routing devices. For example, ports #4-#6 are connected to PCs (Personal Computers) 41. The switch 14 may be configured to not send failure notification messages 37 or 39 to PCs 41 since these devices are not used for routing packets over a packet switched network.

Figure 6:
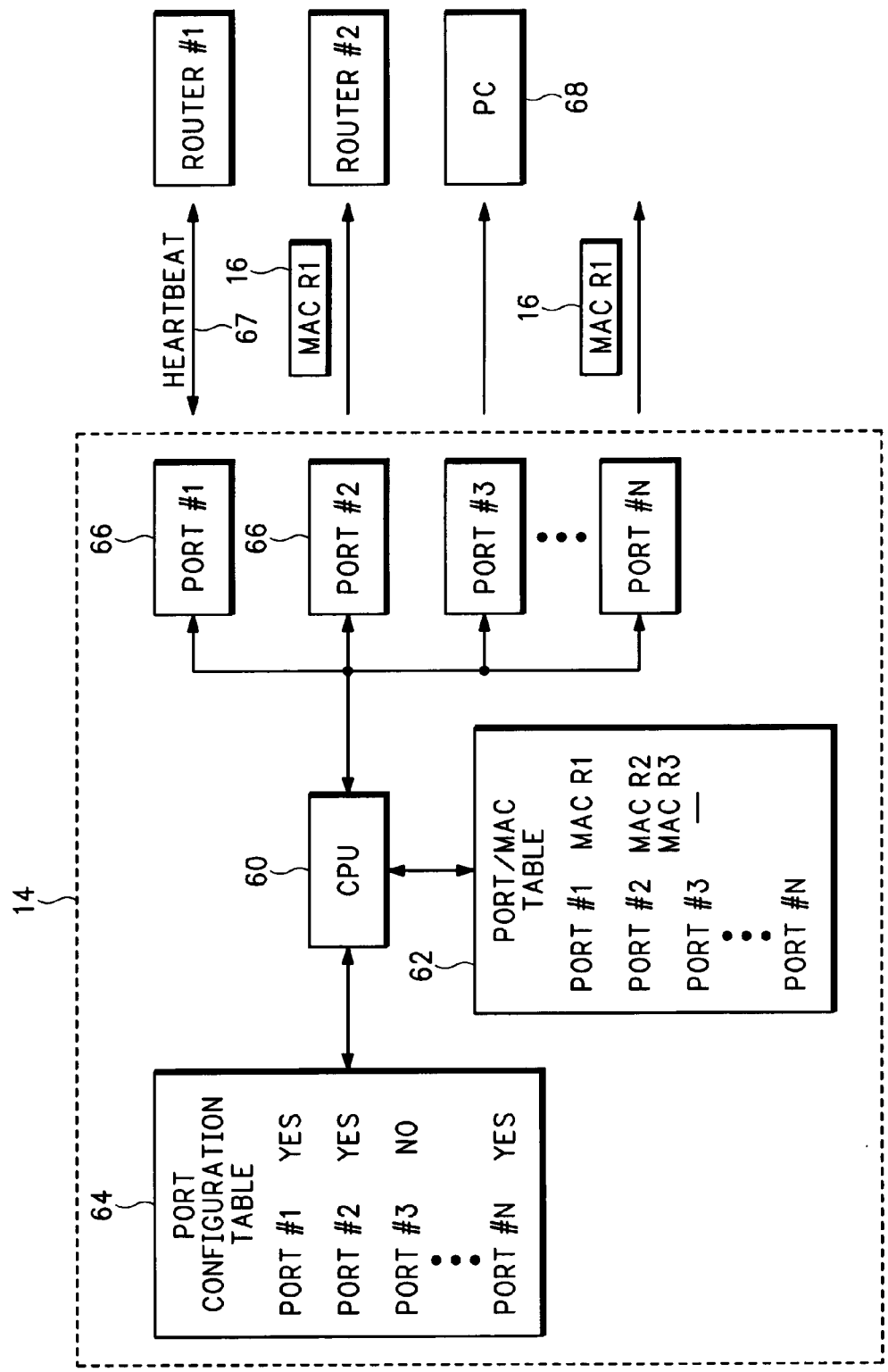
FIG. 6 is a detailed diagram of a switch that provides FFD.

FIG. 6 shows in further detail the functional elements in the switch 14 needed to perform FFD. A CPU (Central Processing Unit) 60 communicates with multiple ports 66 in the switch 14. A heartbeat, or other failure detection signal 67, is constantly sent between the ports 66 and the connected network processing devices. Whenever, the signal 67 indicates a failure, the port 66 associated with the signal notifies CPU 60.

The switch 14 includes a table 62 that identifies the one or more MAC addresses associated with each port 66. The switch 14 may optionally include a port configuration table 64 that identifies which ports need to be notified when a port failure is detected. For example, port #3 is coupled to a PC 68 and therefore may not need to be notified of port failures. The table 64 is therefore configurable to disable failure notifications to port #3. The CPU 60 will then send out failure notification messages 16 only to the ports 66 that are enabled in table 64.

Figure 7:
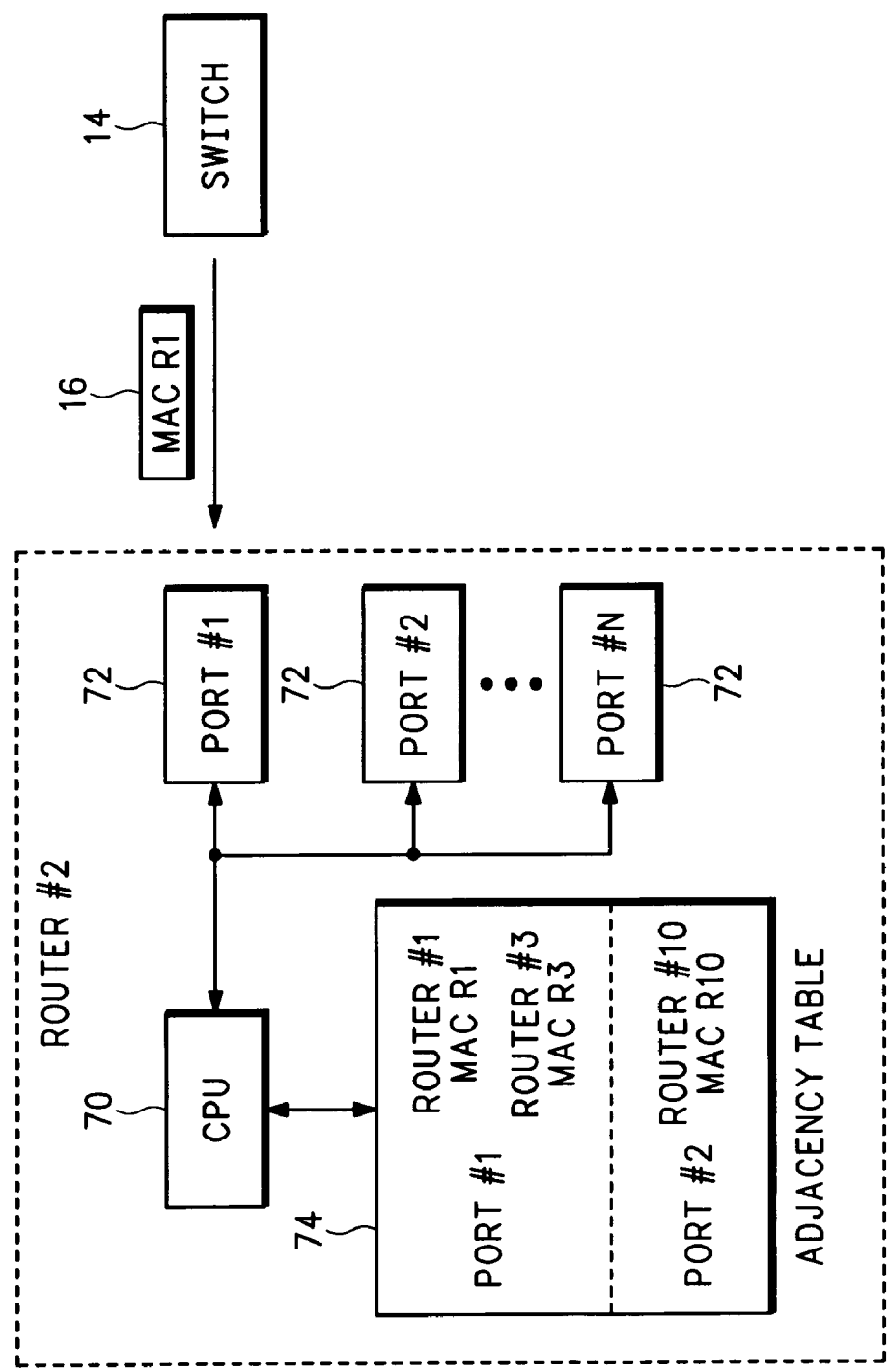
FIG. 7 is a detailed diagram of a router that provides FFD.

FIG. 7 shows in further detail the functional elements in one of the routers #2 or other network processing devices that process a failure notification message 16 from the switch 14. The failure notification message 16 is received over one of the ports 72 in the router #2 and sent to the CPU 70. The CPU 70 refers to an adjacency table 74 to determine if the MAC address in failure notification message 16 affects any of the router adjacencies.

The CPU 70 looks at all adjacencies that are reachable over the port that received the failure notification message 16. For example, if there were three routers #1-#3 connected to the switch 14, there could be two MAC address adjacencies MAC R1 and MAC R3 in the adjacency table 74 in router #2 for port #1. If the failure notification message 16 includes a MAC address matching an adjacency, the router #2 declares the adjacency down and the CPU 70 routes around the down adjacency.

Failure Notification Messages

Any number of different protocols can be used by the switch to notify routers that a MAC address is no longer reachable via a switch port. In one example, a proprietary protocol such as CDP (Cisco Discovery Protocol) is enhanced to generate the failure notification message 16 (FIG. 1).

Figure 8:
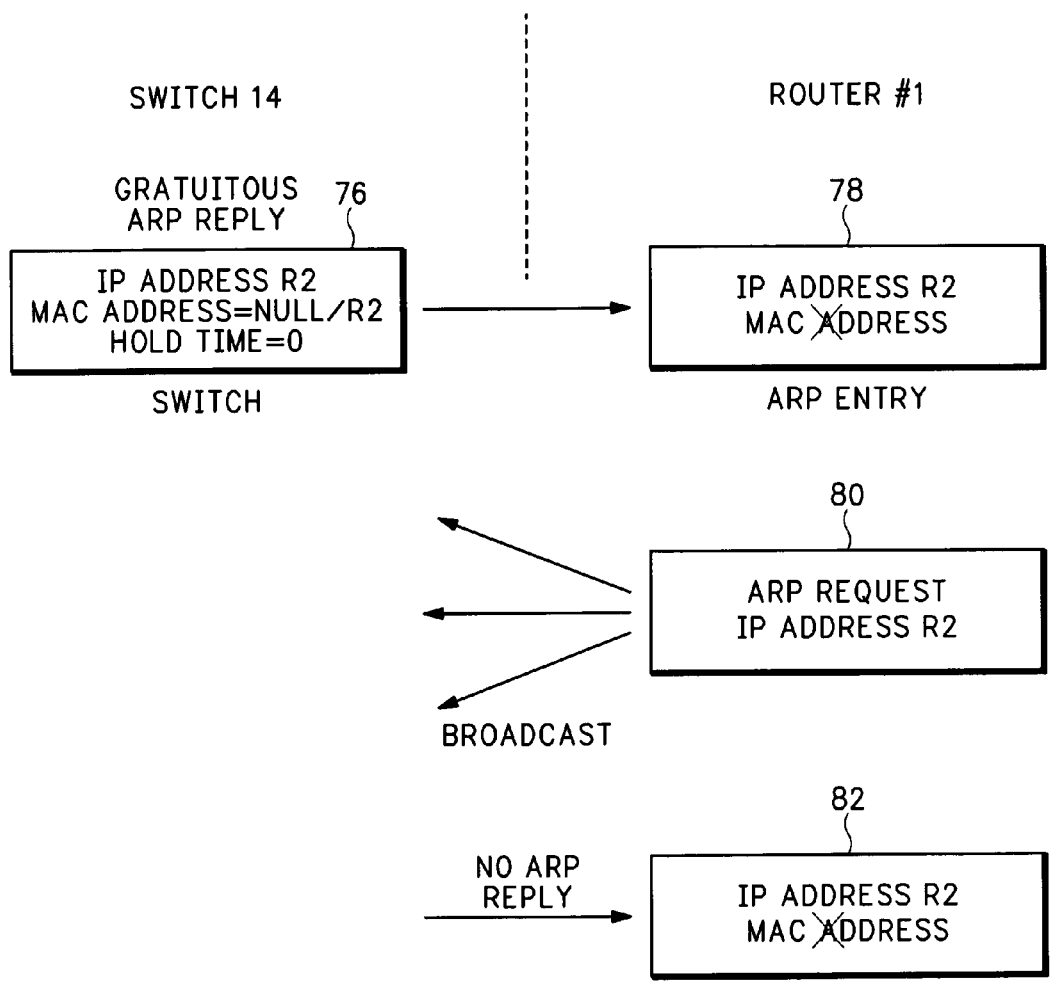
FIG. 8 is a block diagram showing how a switch notifies routers of a failure using an Address Resolution Protocol.

In another implementation, an existing Internet ARP (Address Resolution Protocol) is used by the switch 14 to notify routers of port failures. Referring to FIG. 8, the switch 14 reports the failure of a particular MAC address by issuing a "gratuitous ARP reply" 76. The ARP reply 76 includes the MAC address associated with the down port, and a holding time of zero. If the switch provides layer 3 functionality, then the ARP reply 76 may also include the IP (Internet Protocol) address for the router associated with the failed MAC address along with a null MAC address.

Router #1 receives the ARP reply 76. As a security measure router #1 may check the source MAC address of the ARP reply 76 to ensure it came from the switch 14. The zero hold time in the ARP reply 76 causes the router to immediately disassociate the MAC address in the ARP reply 76 with the associated IP address in the router #1 ARP entry 78.

In one implementation, the router #1 will immediately route around the MAC address if it is identified as an adjacency. In another implementation, the disassociated ARP entry 78 causes the router #1 to immediately broadcast an ARP request 80. The ARP request 80 includes the IP address associated with the nulled ARP MAC entry. When no ARP reply is received in response to the ARP request 80, any adjacency currently deemed "up" for the ARP entry 78 that no longer exists, is declared down, and route computation is initiated.

A switch implementing VLANs (Virtual Local Area Networks) can perform a separate instance of the failure detection scheme for each VLAN to prevent falsely reporting failures across VLAN boundaries.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method for identifying failures in a network, comprising:
   detecting a port failure in a layer two switch that is connected to a plurality of layer three routers, wherein the layer three routers are configured to route traffic according to logical addresses included in the traffic and the layer two switch is configured to forward the traffic according to physical addresses included in the traffic;
   identifying an unreachable Media Access Control (MAC) address belonging to a router that is unreachable from the switch and associated with the port failure; and
   sending failure notifications to other ports on the switch that identify the unreachable MAC address associated with the port failure, the failure notifications being sent from the switch to the remaining reachable routers;
   wherein the failure notifications include the unreachable MAC address to identify the router as being unreachable from the switch, and wherein the failure notifications are configured to cause the remaining reachable routers to determine whether to update internal routing tables to route around an adjacency other than the switch.

2. The method according to claim 1 including sending the failure notifications using an Address Resolution Protocol (ARP) reply.

3. The method according to claim 2 including sending in the ARP reply any combination of a null IP address, a null MAC address, or a zero hold time value.

4. The method according to claim 1 including using a heartbeat signal to detect the port failure.

5. The method according to claim 1 including configuring the switch to send the failure notifications only to the other ports in the switch coupled to routers or other switches.

6. A computer readable medium encoded with instructions for identifying failures in a network, the computer readable medium comprising:
   code configured to detect a port failure that disrupts communication between a bridging device and one of a plurality of routing devices connected thereto;
   code configured to identify an unreachable Media Access Control (MAC) address belonging to the routing device that is associated with the port failure and unreachable from the bridging device; and
   code configured to send failure notifications to other ports on the bridging device that identify the unreachable MAC address associated with the port failure, the failure notifications including the unreachable MAC address, the failure notifications sent from the bridging device to the remaining reachable routing devices;
   wherein the failure notifications are configured to cause the remaining reachable routing devices to determine whether to update internal routing tables to route around an adjacency other than the bridging device.

7. The computer readable medium according to claim 6 including:
   code configured to identify when multiple ports connected to a network processing device have failed; and
   code configured to send separate failure notifications to the other ports in the bridging device identifying each one of the multiple ports that have failed.

8. The computer readable medium according to claim 7 including code configured to send the failure notifications using an Address Resolution Protocol (ARP) reply.

9. The computer readable medium according to claim 8 including code configured to generate the ARP reply so that a receiving network processing element will send out an ARP request for the unreachable MAC address in the ARP reply.

10. The computer readable medium according to claim 8 including code configured to send in the ARP reply any combination of a null IP address, a null MAC address, or a zero hold time value.

11. A system for identifying failures in a network, comprising:
 means for detecting a port failure that disrupts communication between a switch and one of a plurality of routers connected thereto;
 means for identifying an unreachable Media Access Control (MAC) address belonging to the router that is associated with the port failure and unreachable from the switch; and
 means for sending failure notifications to other ports on the switch that identify the unreachable MAC address associated with the port failure, the failure notifications sent from the switch to the remaining reachable routers;
 wherein the failure notifications include the unreachable MAC address;
 and wherein the failure notifications are configured to cause the remaining reachable routers to determine whether to update internal routing tables to route around an adjacency other than the switch.

12. The system according to claim 11 including:
 means for identifying when multiple ports connected to a network processing device have failed; and
 means for sending separate failure notifications to the other ports in the switch identifying each one of the multiple ports connected to the network processing device that have failed.

13. The system according to claim 11 including means for sending the failure notifications using an Address Resolution Protocol (ARP) reply.

14. The system according to claim 11 wherein the failure notifications are configured to cause a receiving network processing element to route around an adjacency associated with the unreachable MAC address when no reply is received in response to the address request.

15. The system according to claim 13 including means for sending in the ARP reply any combination of a null IP address, a null MAC address, or a zero hold time value.

16. The system according to claim 11 wherein the unreachable MAC address belongs to an unreachable network processing device.

17. The system according to claim 11 wherein the failure notifications include a source MAC address and a destination MAC address in addition to the unreachable MAC address.

18. A local router, comprising:
 a network interface to communicate with a switch that bridges the local router to another router, wherein the layer three routers are configured to route traffic according to logical addresses included in the traffic and the layer two switch is configured to process traffic according to physical addresses included in the traffic; and
 circuitry configured to:
 receive a failure notification from the switch, the failure notification including a physical address;
 determine whether the physical address corresponds to an adjacent router of an active route by comparing the physical address to an internal routing table; and
 according to the comparison, remove the active route from the internal routing table and reconfigure the internal routing table with a different active route that routes around the adjacent router, wherein the update to the internal routing table causes the local router to route traffic around an adjacency other than the switch.

19. The local router of claim 18 wherein the switch that couples the local router to another router is configured to forward received traffic according to physical addresses included in the received traffic and the local router is configured to route according to network addresses.

20. The local router of claim 19 wherein the replacement route includes the switch sending the failure notification.

21. The local router of claim 18 wherein the circuitry is further configured to perform route re-computation to identify the different active route.

22. The local router of claim 21 wherein the circuitry is further configured to determine whether the internal routing table includes more than one physical address for the adjacent router, and remove the active route according to the address determination.

23. A method, comprising:
 coupling a plurality of layer three routers together through a layer two switch, wherein the routers are configured to route traffic according to network addresses included in the traffic and the switch is configured to process the traffic according to physical addresses;
 responsive to the switch detecting a local port failure, identifying an unreachable physical address belonging to one of the routers that is associated with the port failure and unreachable from the switch;
 generating failure notifications using the switch, the failure notifications to be sent from the switch to the remaining reachable routers, the failure notifications configured to cause the remaining reachable routers to determine whether to update internal routing tables to route around an adjacency other than the switch; and
 sending the failure notifications to the remaining reachable routers.

24. The method of claim 23, wherein, responsive to receiving one of the failure notifications, one of the remaining reachable routers routes around a network element that was not a sender of the failure notification messages and that was not a receiver of the failure notification messages.

* * * * *